United States Patent Office 3,417,817
Patented Dec. 24, 1968

3,417,817
STIMULATION USING DRY ACID SLURRY
John P. Moore, Metairie, La., assignor to Shell Oil Company, New York, N.Y., a corporation of Delaware
No Drawing. Filed Aug. 8, 1967, Ser. No. 659,043
7 Claims. (Cl. 166—30)

ABSTRACT OF THE DISCLOSURE

A process for stimulation of underground formations having heterogeneous permeable productive zones utilizing a technique to temporarily but selectively plug portions of the formation with a solid acidic material readily susceptible to chemical dissolution, acidizing the less permeable productive areas and thereafter unplugging the temporarily plugged areas in the productive zone by chemical dissolution and, thereby, improve the recovery of oil therefrom.

---

This invention is directed to a new, novel and improved process for recovering economically and effectively hydrocarbon fluids, e.g., gas and/or oil, from underground formations having heterogeneous permeability. More particularly, the present invention is directed to a process for improving the recovery of liquid hydrocarbons from such formations by temporarily sealing or plugging the more permeable sections of the formations in order of decreasing permeability with a supersaturated solution of dry solid acidic plugging or diverting material which is readily dissolvable or chemically disintegratable. The heterogeneous permeable temporarily plugged areas of the oil or gas productive zone are then acidized to render said formation more uniformly permeable, thereafter removing the temporary plugging material and finally restored to a producible status for hydrocarbons by suitable means such as backflow or injection-production techniques.

Background of the invention

The problem of selective plugging of formations to improve oil and gas recovery is well known in the art as evidenced by reference to U.S. Patents 2,864,448, 2,801,699, 2,787,325, 3,261,400 and 3,141,503. In general, the entire permeable zone is plugged with a uniform plugging material and thereafter the less permeable zones are treated in a suitable manner so as to render them more permeable such as by acid treatment or the like. Under known conventional conditions it is frequently an extremely difficult and costly procedure to subsequently remove the plugging material from desired productive zones for subsequent recovery of oil.

In many situations it is common practice to drill through all oil-productive zones, cement and perforate casing so as to produce all zones simultaneously. In other cases, sand production is a problem and special liners to exclude sand are hung through the productive intervals or zones rather than to cement and perforate casing. In other instances it is a production practice to place a gravel filter between a screened liner and the perforated casing to exclude sand. In liner completions, it is often very difficult, if not impossible, to successfully conduct recovery operations when one of the zones is more permeable than other portions of the oil sand. As a result, the displacing fluid, such as steam, gas or water, channels quickly through thief zones or depleted permeable zones or results in water or gas coning resulting in poor displacement in the remainder of the oil sands.

In heterogeneous permeable formations and particularly those with thief zones, it is generally necessary to inject a compound into the more permeable section particularly in the vicinity of the borehole so as to create a permanent plug. However, this is very difficult to do because communication behind the liner permits the plugging agent to flow into the oil sands where plugging is not desired. Mechanical means or use of fluids of varying viscosities and gel-set times to control the flow of plugging agents behind the liner are generally unsuccessful and in addition are costly and difficult to control and place or remove if necessary or desirable. Therefore to selectively plug permeable productive zones of formations and thereafter treat the less permeable areas thereof by acidization or other suitable means so as to render the formation essentially uniformly permeable on removal of the plug is difficult to achieve.

It is an object of the present invention to recover hydrocarbon fluids, e.g., gas or oil, from productive zones, e.g., oil-bearing zones, by an improved process of selectively but temporarily plugging certain highly permeable zones in the productive zones of such formations.

Still another object of the present invention is to temporarily plug heterogeneous productive zones without essentially plugging less permeable productive zones thereof.

Still another object of the present invention is to temporarily plug the highly permeable oil-productive zones with a dissolvable solid acidic plugging material and thereafter increasing the permeability of the less permeable areas by acidization.

Still another object of this invention is to temporarily plug a heterogeneous permeable oil-productive zone with a dissolvable solid acidic plugging material, acidizing the less permeable areas and thereafter removing the plugging materials by acid dissolution so as to render the entire productive zone essentially uniformly permeable.

Still another object of the present invention is to recover oil from oil-productive zones of a formation using fluid drives by first temporarily plugging the oil-productive zones with a solid acidic material subject to dissolution by chemical action, removing portions of the plug from the less permeable areas by acidization, thereafter removing completely the temporary plug by chemical dissolution and finally recovering oil therefrom by use of a fluid drive injected into said now essentially uniformly permeable oil-productive zones through an injection well by use of backflow or through a production well.

Summary of the invention

Briefly stated, the process of the present invention comprises improving hydrocarbon recovery from heterogeneous productive zones of underground formations and prevents gas or water coning and loss of fluid drive due to fingering and the like by temporarily plugging the highly permeable zones of such formations with a supersaturated acidic solution containing dry solid acidic materials, thereafter increasing the permeability of areas in the productive zone by acidization or other suitable means and finally removing the temporary plugging material from the heterogeneous productive zones by chemical dissolution of the solid acidic plugging material so as to render the productive zone essentially uniformly permeable thereby preventing fluid drive losses and improving and increasing hydrocarbon recovery. By a supersaturated acidic solution containing dry solid acidic materials is meant an acidic solution preferably an aqueous acidic medium supersaturated with a dry acid which may be in flake, particle or crystalline form in which the undissolved acid particles act as the diverting or temporary plugging agents.

Description of the preferred embodiments of the invention

As stated above, the process of the present invention comprises: (1) either temporarily plugging the more permeable zones of a heterogeneous permeable productive zone with a supersaturated solution of dry acid or (2) temporarily plugging the entire permeable productive zone and thereafter acidizing the less permeable areas so that on chemical dissolution of the temporary plug the entire productive zone is rendered essentially uniformly permeable.

To accomplish the essence of the process of the present invention the essential steps comprise:

Injecting a supersaturated solution of a dry acid containing substantial amounts of solid dry acid particles suspended therein in a well borehole and into a hydrocarbon productive formation zone to be treated;

Maintaining said solution therein for a time sufficient to preferably temporarily plug the more permeable areas or the entire permeable zone;

Injecting an acidizing fluid into the formation to increase the permeability of the less permeable area of the formation;

Continuing acid injection until the temporary plug of dry acid is dissolved; and Recovering hydrocarbons therefrom by suitable means, preferably by a drive fluid.

Dry acids useful to form supersaturated solutions or slurries of the present invention can be any dry acid which in a supersaturated solution contains substantial amounts of solid acid in the solution or slurry and includes sulfamic, glycollic, fumaric, oxalic, citric, tartaric, p-hydroxy benzonic acids and the like, some of which are commercially available under the trade names of "Visco 900" or "Instant Acid" obtained from Visco Chemical Company and Dowell, respectively.

The solvent or carrier liquid for the dry acid can be an acidic aqueous or hydrocarbon liquid such as water acidified with hydrochloric acid, e.g., a 15–30% HCl water solution. Illustrative examples of temporary plugging compositions are as follows: (A) 15% dilute HCl aqueous solution supersaturated with sulfamic acid; (B) 15% dilute HCl aqueous solution supersaturated with glycollic acid; (C) 15% HCl solution containing 2.5 lb./gal. of sulfamic acid; (D) aqueous solution of super mud acid (9% HCl and 6% HF) supersaturated with sulfamic acid and (E) 15% dilute HCl aqueous solution supersaturated with oxalic acid.

Acidizing with an undersaturated solvent to remove part or the entire temporary plug can be accomplished by using suitable acidization techniques. The acidizing process can be accomplished by using any acidic material, which can be either gaseous or liquid, capable of dissolving the temporary plug and increasing the permeability and/or porosity of formations. Particularly effective means of acidization of formations under discussion include use of the materials and methods described in the Dilgren U.S. Patents 3,307,630, 3,215,199 and 3,297,090.

The acidizing fluid as described is injected through wells penetrating the productive oil zone at a pressure normally less than the fracturing pressure and at a rate not dependent upon the creation of a fracture between the connecting pair of wells. The permeable zone thus formed is preferably not fractured until after acidization of the formation has established sufficient permeability for a significant amount of fluid communication between wells, if fracturing appears to be attractive or desirable to improve or increase fluid communication.

Once a permeable and/or porous horizontal channel connecting a pair of wells penetrating an oil shale formation has been established, various thermal, pyrolysis, or explosive means such as hot fluid injection, e.g., steam, hot water and mixtures thereof, hot gases, e.g., air, gaseous hydrocarbons such as hot hydrogen sulfide and mixtures of hydrocarbons and hydrogen sulfide; solvents, e.g., aliphatic and aromatic liquid hydrocarbons, such as benzene, xylene, kerosene, etc., said solvents may be hot or cold as well as conventional in situ combustion means such as injecting thermal energy to selected portions of the formation as well as various other means as described on pages 95–104 of the World Oil issue of January 1965 and U.S. Patents 3,105,545, 3,150,715, 3,208,516, 3,221,810 and 3,250,328 as well as exposives (liquid or solid) can be employed for fluidizing materials for recovering through the production well and processing it for oil recovery. However, the temporary plug can be removed by use of a simply undersaturated acid solution such as hydrochloric acid solution or the like.

A preferred method for treating productive zones of an underground formation in order to improve and stimulate oil recovery therefrom comprises injecting into the formation a 15% HCl supersaturated aqueous solution containing sulfamic acid and continuing the injection until the sulfamic acid plugs the formation sufficiently to reduce inflow to a desired state which can be determined by pressure changes or the like. Thereafter an undersaturated solution of 15% HCl is injected in which the plugging acid (sulfamic acid) is soluble or dissolvable and the process is continued until the less permeable portion of the formation is acidized sufficiently to increase its permeability to essentially the same degree as the more permeable zone and continuing dissolution of the temporary plug or dry sulfamic acid until the productive zone is essentially uniformly permeable.

Once the well has been properly prepared by the process of the present invention, any driving fluids may be used to aid in recovery of the oil and include steam and/or water which may contain surfactants such as ionic, cationic and/or non-ionic surfactants, e.g., sulfonates, polyalkoxy phenols, and the like, as well as hydrocarbons such as lower hydrocarbons and mixtures thereof and/or in situ combustion drives.

Treatment of formations by the process of this invention is equally effective on oil, gas or water injection wells and removing the temporary dry acid plug by any acid media is also effective.

The foregoing description of the invention is merely intended to be explanatory thereof. Various changes in the details of the described method may be made, within the scope of the appended claims, without departing from the spirit of the invention.

I claim as my invention:

1. An improved method for recovering hydrocarbons from underground formations having heterogeneous permeable zones traversed by a borehole, comprising:

forcing through the borehole and into the heterogeneous permeable productive zone a supersaturated fluid containing a dry acid and forming a temporary plug;

forcing through the borehole and into the temporary plugged zones an acidizing solution to increase the permeability of the less permeable area of the productive zone;

continuing acidizing the productive zone to remove the temporary plug by dissolution; and, recovering oil from the oil-productive zone.

2. A method of claim 1 wherein the dry acid is selected from the group consisting of sulfamic, glycollic, fumaric, oxalic, citric, tartaric, p-hydroxy benzonic acids and mixtures thereof.

3. The method of claim 2 wherein the acidizing medium is one which is capable of completely dissolving the temporary plug of the dry acid selected from the group consisting of sulfamic, glycollic, fumaric, oxalic, citric, tartaric, p-hydroxy benzonic acids and mixtures thereof.

4. The method of claim 2 wherein the acidizing medium is one which is capable of completely dissolving the temporary plug of sulfamic acid.

5. The process of claim 4 wherein the fluid and acidizing medium is a 15% HCl solution.

6. The process of claim 3 wherein the fluid and acidizing medium is a mixture of HCl and HF.

7. The process of claim 3 wherein the fluid and acidizing medium is a 15% HCl solution.

(References on following page)

References Cited

UNITED STATES PATENTS

| | | | |
|---|---|---|---|
| 2,675,083 | 4/1954 | Bond et al. | 166—42 X |
| 2,803,306 | 8/1957 | Hower | 166—42 X |
| 2,804,145 | 8/1957 | Holbrook | 166—42 X |
| 2,858,892 | 11/1958 | Carpenter | 166—29 |
| 2,867,279 | 1/1959 | Cocks | 166—42 |
| 2,897,894 | 8/1959 | Draper et al. | 166—42 X |
| 3,141,501 | 7/1964 | Bernard et al. | 166—42 X |
| 3,261,400 | 7/1966 | Elfrink | 166—30 |
| 3,380,529 | 4/1968 | Hendrickson. | |

STEPHEN J. NOVOSAD, *Primary Examiner.*

U.S. Cl. X.R.

166—42

PO-1050
(5/69)

UNITED STATES PATENT OFFICE
CERTIFICATE OF CORRECTION

Patent No. 3,417,817  Dated December 24, 1968

Inventor(s) John P. Moore

It is certified that error appears in the above-identified patent and that said Letters Patent are hereby corrected as shown below:

Column 3, line 29, change "benzonic" to benzoic.

Claim 2, line 3, change "benzonic" to benzoic.

Claim 3, line 5, change "benzonic" to benzoic.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents